United States Patent
Medvedeva et al.

(10) Patent No.: US 10,107,652 B2
(45) Date of Patent: Oct. 23, 2018

(54) METHOD FOR MEASURING DISPLACEMENTS OF OBJECT

(71) Applicants: Marina Vladimirovna Medvedeva, Voskresensk (RU); Konstantin Borisovich Utkin, St. Petersburg (RU)

(72) Inventors: Marina Vladimirovna Medvedeva, Voskresensk (RU); Konstantin Borisovich Utkin, St. Petersburg (RU)

( * ) Notice: Subject to any disclaimer, the term of this patent is extended or adjusted under 35 U.S.C. 154(b) by 0 days.

(21) Appl. No.: 15/525,367

(22) PCT Filed: Apr. 21, 2016

(86) PCT No.: PCT/RU2016/000227
§ 371 (c)(1),
(2) Date: May 9, 2017

(87) PCT Pub. No.: WO2017/007368
PCT Pub. Date: Jan. 12, 2017

(65) Prior Publication Data
US 2018/0106647 A1    Apr. 19, 2018

(30) Foreign Application Priority Data

Jul. 8, 2015 (RU) ................................ 2015127430
Dec. 4, 2015 (RU) ................................ 2015152019

(51) Int. Cl.
*G01D 5/48* (2006.01)
*G01C 22/00* (2006.01)
(Continued)

(52) U.S. Cl.
CPC ............. *G01D 5/485* (2013.01); *G01C 22/00* (2013.01); *G01D 5/247* (2013.01); *G01D 5/48* (2013.01); *G01P 13/00* (2013.01)

(58) Field of Classification Search
None
See application file for complete search history.

(56) References Cited

U.S. PATENT DOCUMENTS 4,422,041 A   12/1983   Cebis et al.
6,208,131 B1   3/2001   Cebis et al.
(Continued)

FOREIGN PATENT DOCUMENTS

RU   2339957 C2   11/2008
RU   2410700 C1    1/2011
SU   1129490 A    12/1984

*Primary Examiner* — Jermele M Hollington
*Assistant Examiner* — Douglas X Rodriguez
(74) *Attorney, Agent, or Firm* — Nadya Reingand; Yan Hankin

(57) ABSTRACT

The invention relates to measurement technology and is used to determine the absolute displacements of objects in metallurgy, automotive industry, warehouse and production logistics, and in the automation of production. The technical result is achieved when the following steps are performed: the displacement transducer is mounted on the object; signal sources are mounted along the trajectory of the object displacement; on each section of the trajectory, an arrangement of the signal sources is provided which is determined by changing the number of signal sources and/or the distance between any two signal sources; a signal is sent to the moving object with transducer; an output signal is received from the transducer regarding the location of the signal sources located within the measurement range; the object location is determined; furthermore, the displacement is measured at a distance exceeding the length of the active zone of the transducer.

12 Claims, 1 Drawing Sheet

(51) Int. Cl.
*G01P 13/00* (2006.01)
*G01D 5/247* (2006.01)

(56) References Cited

U.S. PATENT DOCUMENTS

| | | | | |
|---|---|---|---|---|
| 7,394,244 B2* | 7/2008 | Schley | ............... | G01D 5/252 |
| | | | | 324/207.2 |
| 2005/0140362 A1* | 6/2005 | Rhodes | ............... | G01D 5/251 |
| | | | | 324/207.21 |
| 2009/0128141 A1* | 5/2009 | Hopmann | ........... | E21B 47/0905 |
| | | | | 324/207.24 |
| 2010/0085041 A1* | 4/2010 | Pozidis | ............... | B82Y 15/00 |
| | | | | 324/207.21 |

* cited by examiner

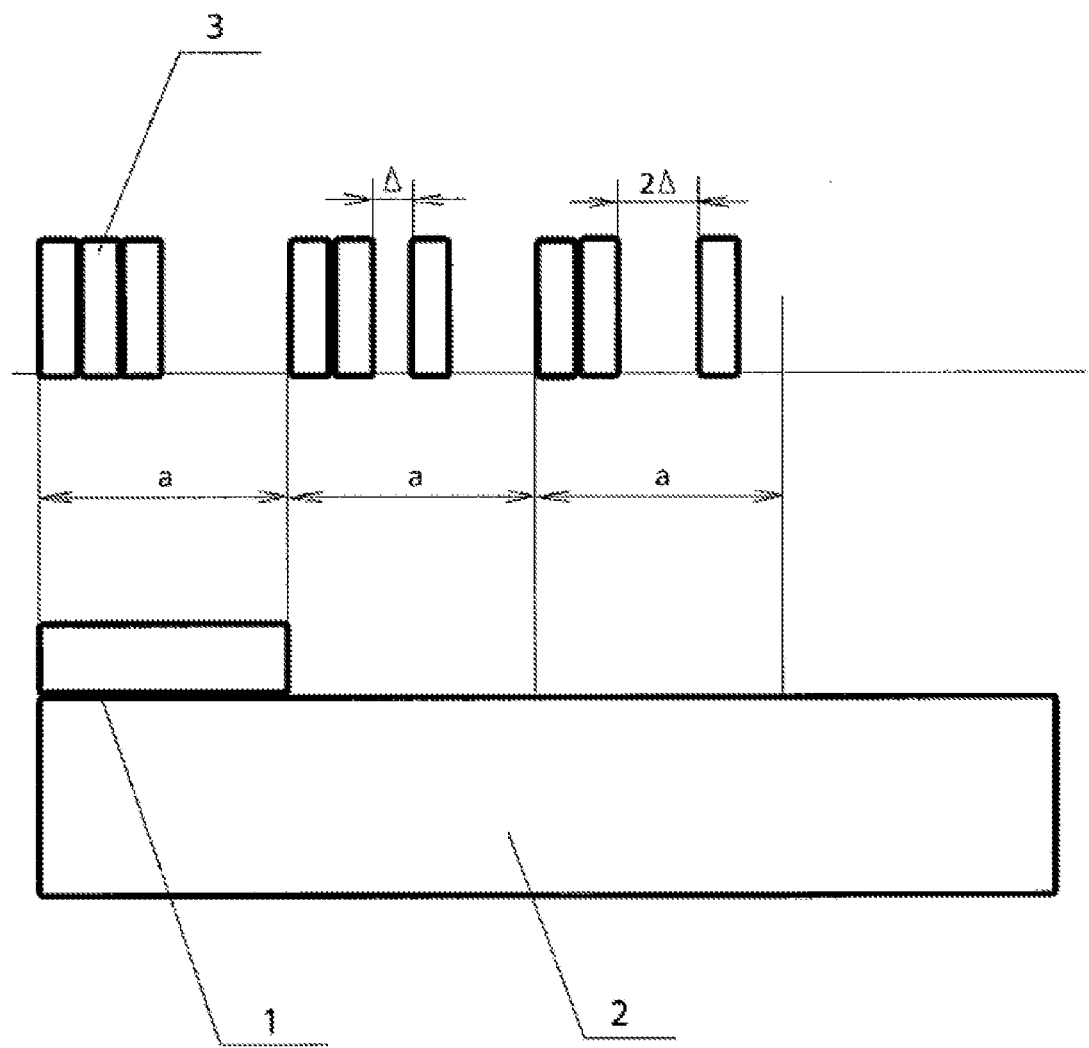

METHOD FOR MEASURING DISPLACEMENTS OF OBJECT

CROSS REFERENCE TO RELATED APPLICATIONS

The present patent application is National stage application from PCT application PCT/RU2016/000227 filed on Apr. 21, 2016 which claims priority to Russian patent applications RU2015127430 filed Jul. 8, 2015 and RU2015152019 filed Dec. 4, 2015, all of which incorporated herein by reference entirely.

FIELD OF INVENTION

The invention relates to the measuring equipment and can be used to determine the absolute displacement of objects in such areas as, for example, metallurgy, automotive industry, cranes, warehouse and production logistics, the production automation as a whole.

BACKGROUND

When expending operational tasks in production, increasing of production process efficiency plays an important role. It can be achieved in particular due to fast and accurate object positioning at different periods of time within the production facilities. Effective monitoring of object movements allows creating an exact map of the production process, for example, at nighttime, and thereby reducing the number of employees involved.

Known methods for measuring of object displacement are based on the displacement of a transducer and a signal source with respect to each other. For example, in digital systems a signal from the source is processed to obtain a value of a moving object only if the transducer received it. Thus, the accuracy of object position detection depends on the value of the measuring range of transducers, which in turn depends on and is limited to the area of the transducer sensitivity.

A known method for measuring of object displacement (JP0850004, 20 Feb. 1996) consists of the following: the signal source—a magnet—is installed on the object; along the path of its movement the transducers—Hall sensors—are arranged. The exciting current is applied to the transducers. When an object is in motion, the voltage values are taken from the Hall sensors and then the value of the object movements are calculated.

The disadvantages of this method are the low accuracy of measuring and limited measurement range due to transducers sensitivity area. In addition, it is necessary to lay an electric cable to each of the Hall sensor to ensure its supply and signal pickup. Thus, it considerably complicates the measurement system.

There are known methods for measuring of object displacement (RU2125235, 20 Jan. 1999, RU2117914, 20 Aug. 1998), according to which the transducer is installed on a movable object, the ultrasonic waves propagate from the sources located along the path of the object. One measures the signal propagation time from the source to the transducers and this value is used to estimate the value of the linear movement of the object.

The disadvantage of these methods is the inability to measure the object position outside the area of transducer sensitivity that does not allow to measure movement of the object to considerable distances, and thereby limits the use in production.

There is a known method for measuring of object displacement (RU2196300, 10 Jan. 2003), according to which the transducer—a photoelectric receiver is installed on a moving object; using an optical system a light signal is fed to the transducer from the sources located along the path of the object, the photoelectric receivers use the output signal to estimate the value of object movement.

The disadvantage of this method is the low accuracy, as far as the value of object movement depends on the location, size and intensity of the light spot on the photoelectric receiver. Using this method it is impossible to measure the object movement at a considerable distance. Moreover implementation of the method requires the additional equipment to be used (the optical system, the additional photoelectric receiver to account for the light flow instabilities of the emitter) that causes inconvenience in use and leads to additional expenses for object positioning.

There is a known method of determining the absolute displacement of objects (RU93003536, 10 Aug. 1995), according to which the mask and the measuring scale have a few rows of identical slots so that periods of slot arrangement have no common dividers. The mask is placed on the movable object, the measurement scale is set along the path of the object; by passing of the object with the mask along the measuring scale the intensity of light passing through the slots of the mask and the measuring scale is changed with a predetermined period, and values of the period fractions for each row have no common integer dividers, and thus the absolute value of moving object is determined.

This method makes it possible in theory to increase the measuring range of object positioning due to unique periods of the mask and the measuring scale in any period of time. However, the application of dividers on the mask and the measuring scale is time-consuming and inconvenient; thus, virtually measuring the object displacement at a considerable distance is not possible. In addition, the accuracy of movement determination depends on the intensity of light spots produced after passing through the mask slots. In this connection the accuracy is low.

There is a known method for measuring of object displacement (RU1820209, 7 Jun. 1993), taken as the closest analog to the subject method. It consists of the following: the transducer—a photosensitive charge-coupled device—is installed on a movable object. Along the path of the object movement there are signal sources—the illuminating line, the signals—rays of light—are formed and the distance between them is less than the transducer length. Cyclic polling of the transducer is put into effect. The signal sources are switched on in a predetermined sequence, one for each polling cycle of the transducer. When receiving the output signal, exhaustive search for switching on the signal sources is stopped, the output signal is converted, the signal source number is determined, and due to it the movement of an object is determined as well.

This method allows increasing the measured distance at which the object can be moved. However, in this case, till the appearance of the output signal, overall time for determining the value of object movement increases due to exhaustive search for switching signal sources. In this method as well as in the analogs measurement accuracy is dependent on the area of the transducer sensitivity.

SUMMARY

The object of the invention is to increase the distance at which the object can be moved and to develop a method for measuring object displacements, in which different types of signal sources can be used, including magnets and/or electromagnets, as well as different types of transducers, including magnetostrictive transducer.

The technical result consists in the increase of the measurement accuracy of the moving object and the increase of the speed of information processing received from the transducer and outputting data of the object and/or the transducer position.

The technical result is achieved due to the usage of the displacement measuring method, consisting of the following: the transducer is installed on the object, along the path of the object there are signal sources, at each path section a special arrangement of signal sources is provided, that determines the change in the number of signal sources and/or the change of the distance between any two signal sources the signal is sent to a moving object with the installed transducer, then an output signal from the transducer is received with the report about the position of signal sources that are in its measurement range; then the position of the object and/or the transducer is determined, and the displacement at a distance greater than the active zone length of the transducer is measured.

The arrangement of signal sources, which is determined by changing the number of signal sources and/or the distance between any two signal sources, provides nonrecurring unique combinations of these signal sources at any part of the object path. It provides unambiguous identification of transducer position at any time and further allows most accurately determining the position of the object as it moves, increasing the accuracy of the object displacement measurement, as well as increasing the distance the object can be moved.

Unique combinations of signal sources in each path section can be determined only by changing the number of mentioned signal sources. In this case, within the sensitivity zone of the displacement transducer a unique combination from different number of signal sources is located, which allows uniquely identifying the position of the object and/or the transducer and determining its displacement. The distance at which the object is moved, exceeds the range of the transducer sensitivity area.

Unique combination of signal sources at each path section can be determined only by changing the distance between any two mentioned signal sources. In this case, the arrangement of signal sources in any 1D-, 2D-, 3D-, nD-dimension is possible. In any position of the displacement transducer within its sensitivity area there is a unique combination of the same number of signal sources disposed in the space without repetitions that allows uniquely identifying the position of the object and determining its displacement.

Also, unique combination of signal sources at each path of the object movement can be determined by changing the number of signal sources and by changing the distance between any two signal sources. In this case, a unique combination of different number of signal sources in any 1D, 2D, 3D, nD-measurement with a different distance between any two signal sources will be located in the sensitivity area of the transducer for uniquely identifying the position of the object and determining its displacement.

Receiving nonrecurring combinations of signal sources allows determining not only the position and movement of the object and/or the transducer but also precisely identifying number of signal sources and their other parameters, if necessary.

This method can be implemented by means of any signal sources and transducers.

Magnets and/or electromagnets, elements containing magnets and/or electromagnets, structures containing magnets/electromagnets can be used as signal sources.

In the function of signal sources one can use, for example, light sources, heat sources, radiation sources of any kind, kinetic energy sources, pressure sources, ultrasonic waves, any material having inductive and/or capacitive physical properties, i.e. virtually any material, source with encoded information (for example, barcodes, 2D codes, 3D codes nD-codes, where n is an integer number).

Magnetostrictive transducers, various designs containing magnetostrictive transducers, can be used as transducers. Hall sensors, photocells, magnetostrictive transducers, inductive and capacitive transducers, radiation transducers, pressure transducers and other energy converters also can be used as transducers.

Also, the components of the identification system, such as the reader (processor) and the attached antenna (read/write head), can be used as transducers, while tags (chips, data carriers) will act as a signal source.

Processing of the output signal received from the displacement transducer is provided using appropriate equipment in accordance with the used types of signal sources and displacement transducers. Information for processing can be transmitted over different interfaces and protocols, such as analog interface, TCP/IP, IO-Link, ASInterface, Profinet, Profibus, DeviceNet, CANopen, EtherCAT, Ethernet, Varan.

When using this method it is possible to obtain precise information about the time and place of the object in the manufacturing process, so that increases the efficiency of production management.

BRIEF DESCRIPTION OF DRAWINGS

The FIG. 1 shows a device for implementing the claimed method for measuring of object displacement, which comprises the transducer 1 located on the object 2, signal sources 3 mounted along the path of the object movement 2 in such a way that there is a unique arrangement of signal sources at each path point determined by changing of the number of signal sources 3 and/or the distance between any two signal sources 3.

DETAILED DESCRIPTION OF THE PREFERRED EMBODIMENT

For instance, as a transducer there is the magnetostrictive linear displacement transducer 1 set on a moving object. It has a displacement measurement range a. Along the object path the magnets and/or electromagnets 3 are placed. Let's consider the case when at each path section a the same number of magnets and/or electromagnets is used, but the distance between the two magnets and/or electromagnets is being changed (see FIG. 1). So at the first path section equal to the measuring range a of the magnetostrictive displacement transducer, the magnets and/or electromagnets are placed close to each other to form a first unique set. At the second similar path section with the length a the second set of magnets and/or electromagnets is located, in which, for example, the rightmost magnet and/or electromagnet is moved aside at the distance $\Delta$. At the third similar path section with the length a the third set of magnets and/or electromagnets is located, in which, for example, the rightmost magnet and/or electromagnet is moved aside at the distance $2\Delta$, etc. Furthermore the distance at which the object is moved, exceeds the length of the magnetostrictive transducer sensitivity area. We get that at any path section opposite the transducer sensitivity area there is a nonrecurring combination of signal sources, which allows uniquely identifying the position of the object and determining its displacement.

Also, the magnets and/or electromagnets at each path section equal to the measuring range a of the magnetostrictive displacement transducer may be arranged in such a way so that the distance between the magnets and/or electromagnets remains the same, but their number is changed. So that at the first path section two magnets and/or electromagnet can be placed, at the second path there are three magnets and/or electromagnets, etc.

In this case, at any path section opposite the magnetostrictive transducer sensitivity area there is a nonrecurring combination of signal sources, which allows uniquely identifying the position of the object and determining its displacement.

An alternative version of arrangement is possible. The magnets and/or electromagnets are placed at any path section equal to the measuring range a of the magnetostrictive transducer, when not only the number of magnets and/or electromagnets but also the distance between any two magnets and/or electromagnets is changed, i.e. at the first path section, for example, two magnets and/or electromagnets are placed with the distance Δ between them, at the second path section there are three magnets and/or electromagnets with the distance Δ between the first and second magnet and/or electromagnet and the distance 2Δ between the second and third magnet and/or electromagnet, etc. The distance at which the object is moved, exceeds the length of the magnetostrictive transducer sensitivity area as well. In this case, an unequivocal identification of the position and the displacement of the object is also provided.

Data on the unique signal sources arrangement are recorded beforehand to the equipment that is used for output signal processing. When the object moves along the path with the set magnets and/or electromagnets, the magnetostrictive transducer outputs the position value of each of the magnets and/or electromagnets located opposite the object with the magnetostrictive displacement transducer. The received values are transferred to the processing equipment, which compares them with the data on the location of the magnets and/or electromagnets received previously and determines the position of the object and its displacement.

By means of the output signal from the magnetostrictive displacement transducer it is also possible to determine the numbers of the signal sources impacting on this displacement transducer or any other parameters of the signal sources, if necessary.

The increase of the distance of possible object displacement can be calculated as follows. For example, a transducer by Balluff GmbH is used as a magnetostrictive linear displacement transducer. It has a nonlinearity value of 30 μm, the measurement range is 4500 mm. When using this transducer and two signal sources, taking into account that there are changes in the distance of 31 μm between them at each path sector and the minimum required distance between signal sources should be no less than 60 mm, it is possible to get:

$$\frac{\frac{4500}{2} - 60}{0.03 + 0.001} = 70645 \tag{1}$$

unique positions of the mentioned signal sources.

Thus, the total measurement range using two signal sources is as follows:

$$4500 \times 70645 = 317\,902\,500 \text{ mm} \tag{2}$$

with an accuracy of 30 μm.

As a result, the method for measuring the object displacement allows increasing the accuracy of the object displacement measurement alongside the significant extension of the distance at which the object can be moved. It allows increasing the speed of information analysis received from the magnetostrictive transducer and the speed of the object position detection and its displacement over the production area that in its turn increases the efficiency of the production process as a whole. There is only one magnetostrictive transducer necessary for displacement measuring that simplifies not only power supplying but also the method of measurement. In addition for the implementation of the method, various signal sources, displacement transducers and the corresponding equipment for processing the output signal can be used, which makes it universal.

What is claimed is:

1. A displacement measuring method, comprising the following steps:
   installing a transducer on an object,
   installing signal sources along a path trajectory for movement of the object, the path trajectory including a plurality of path sections,
   arranging the signal sources at each path section, the signal sources being arranged in a nonrecurring configuration in each path section,
   moving the object along the path trajectory,
   wherein each nonrecurring configuration of signal sources sends a source signal to the moving object with the installed transducer,
   receiving via processing equipment an output signal from the transducer, the output signal being based on the source signal, the output signal comprising a report about a configuration of the signal sources that are in a measurement range of the transducer, and
   based on the report, determining a position of the object.

2. The method according to claim 1, wherein the signal sources comprise magnets and/or electromagnets, light sources, heat sources, radiation sources, kinetic energy sources, pressure sources, ultrasonic waves, material having inductive and/or capacitive physical properties, or sources with encoded information.

3. The method according to claim 1, wherein the transducer comprises Hall sensors, photocells, magnetostrictive transducers, inductive transducers, capacitive transducers, radiation transducers, or pressure transducers.

4. The method according to claim 1, wherein the transducer comprises a reader and a read/write head and the signal sources comprise chips and data carriers.

5. The method according to claim 1, wherein an arrangement of the signal sources is implemented in 1D, 2D, and 3D.

6. The method according to claim 1, wherein a serial number of a signal source is identified by the output signal from the transducer.

7. The method of claim 1, comprising at least two signal sources at each path section.

8. The method of claim 1, wherein the processing equipment further identifies a number of signal sources at a given path section based on the output signal from the transducer.

9. The method of claim 1, wherein the displacement of the object is determined with an accuracy of 30 micrometers.

10. A displacement measuring method, comprising the following steps:
- installing a magnetostrictive transducer on an object,
- installing magnets and/or electromagnets along a path trajectory of the object, the path trajectory including a plurality of path sections,
- arranging the magnets and/or electromagnets at each path section, the magnets and/or electromagnets being arranged in a nonrecurring configuration in each path section,
- moving the object along the path trajectory,
- wherein each nonrecurring configuration of magnets and/or electromagnets sends a source signal to the moving object with the installed magnetostrictive transducer,
- receiving via processing equipment an output signal from the magnetostrictive transducer, the output signal being based on the source signal, the output signal comprising a report about a configuration of the magnets and/or electromagnets that are in a measurement range of the magnetostrictive transducer,
- based on the report, determining a position of the object, and
- measuring a displacement of the object at a distance greater than an active zone length of the magnetostrictive transducer.

11. The method according to claim 10, wherein an arrangement of the magnets and/or electromagnets is implemented in 1D, 2D, and 3D.

12. The method according to claim 10, wherein a serial number of a magnet and/or electromagnet is identified by the output signal from the transducer.

* * * * *